United States Patent
Hergott et al.

(10) Patent No.: US 6,558,241 B2
(45) Date of Patent: May 6, 2003

(54) METHOD AND APPARATUS FOR CONTROLLING THE OPERATION OF A SAUSAGE MAKING MACHINE

(75) Inventors: Steven P. Hergott, West Des Moines, IA (US); Kenneth B. Arnote, Albion, IA (US); David S. Hamblin, Norwalk, IA (US); Kenneth L. Lebsack, Ankeny, IA (US)

(73) Assignee: Townsend Engineering Company, Des Moines, IA (US)

( * ) Notice: Subject to any disclaimer, the term of this patent is extended or adjusted under 35 U.S.C. 154(b) by 0 days.

(21) Appl. No.: 09/963,150

(22) Filed: Sep. 25, 2001

(65) Prior Publication Data

US 2002/0042247 A1 Apr. 11, 2002

Related U.S. Application Data

(60) Provisional application No. 60/238,227, filed on Oct. 5, 2000.

(51) Int. Cl.[7] ............................................... A22C 11/00
(52) U.S. Cl. ........................... 452/31; 452/30; 452/49
(58) Field of Search ................................................ 452/31

(56) References Cited

U.S. PATENT DOCUMENTS

| | | | | |
|---|---|---|---|---|
| 3,454,980 A | * | 7/1969 | Washburn | 452/31 |
| 4,017,941 A | * | 4/1977 | Raudys et al. | 452/31 |
| 4,257,146 A | * | 3/1981 | Karp | 452/31 |
| 4,322,871 A | * | 4/1982 | Townsend et al. | 452/31 |
| 4,434,529 A | * | 3/1984 | Jensen | 452/30 |
| 4,558,488 A | * | 12/1985 | Martinek | 452/31 |
| 4,602,402 A | | 7/1986 | Schnell | |
| 4,625,362 A | * | 12/1986 | Kollross et al. | 452/31 |
| 4,709,450 A | * | 12/1987 | Stanley et al. | 452/31 |
| 5,083,970 A | * | 1/1992 | Reutter | 452/31 |
| 5,421,137 A | * | 6/1995 | Stimpfl | 53/435 |
| 5,573,454 A | * | 11/1996 | Fox et al. | 452/29 |
| 5,709,600 A | * | 1/1998 | Xie et al. | 452/49 |
| 5,788,563 A | * | 8/1998 | Nakamura et al. | 452/47 |
| 5,971,842 A | * | 10/1999 | Simpson et al. | 452/31 |

FOREIGN PATENT DOCUMENTS

WO　　WO00/47053　　8/2000

\* cited by examiner

*Primary Examiner*—Charles T. Jordan
*Assistant Examiner*—Joan Olszewski

(57) ABSTRACT

A sausage encasing machine has a computer and a casing diameter sensor located on a frame downstream of an exit end of a meat stuffing tube. The sensor is connected to the computer to transmit casing diameter data to the computer as the casing is being sensed. The computer is programmed to sausage diameter parameters, and the computer is programmed to signal a machine power system to cease operation whenever the computer detects that the casing diameter exceeds the predetermined parameters.

17 Claims, 7 Drawing Sheets

METHOD AND APPARATUS FOR CONTROLLING THE OPERATION OF A SAUSAGE MAKING MACHINE

CROSS REFERENCE TO RELATED APPLICATION

This application is based upon the Applicants' Provisional Application Ser. No. 60/238,227 filed Oct. 5, 2000.

BACKGROUND OF THE INVENTION

Modern sausage making machines extrude meat emulsion into an elongated hollow casing to create a sausage strand. These machines divide the strand into a plurality of links, and the linked strand is then deposited on a conveyor for final disposition. The sausage casings have finite lengths, so the machines have to be stopped each time a given casing has been filled. When a casing breaks, the machine is stopped to replace the casing, and to avoid wastage of meat emulsion. Further, the uniformity or consistent geometry of the filled casings are not easily monitored. All of the above problems are greater when natural rather than artificial casings are used.

It is therefore a principal object of this invention to provide a method and apparatus for controlling the operation of a sausage making machine by way of a sensor and a PLC which is automatic and continuous, and which can stop the machine instantly whenever any irregular production of sausages is sensed, including running out of casing material, casing breakage, or improperly filled casings.

It is still a further object of the invention to have the sensing means flexible enough in its character in order to take into account varying product diameters and modes of operation of the sausage encasing machine.

It is a further object of this invention to have a sensing means that will scan the encased sausage strand and communicate to a PLC in such a way as to ignore the twists in the casing which separate the sausages or protruding parts of the linker and not stop the machine unless there is a sustained drop in diameter.

These and other objects will be apparent to those skilled in the art.

SUMMARY OF THE INVENTION

The apparatus of the present invention is an improvement on a conventional sausage encasing machine that includes a frame, a meat emulsion pump, an elongated stuffing tube operatively connected to the pump for receiving meat emulsion therefrom and being adapted to slidably receive an elongated hollow sausage casing on an outer surface thereof, a twisting assembly adapted to receive and rotate a casing on the tube when the tube is moved into operative engagement therewith, a casing linking assembly on the frame downstream of the twister assembly to link the casing filled with meat emulsion, and power means on the frame for operating the pump, the twisting assembly, and the linker assembly. A computer is mounted on the frame, a casing diameter sensor is located on the frame and is located downstream of an exit end of the tube to sense the height of the casing downstream of the exit end of the tube. The sensor is operatively connected to the computer to transmit data to the computer as to the height of the top surface of the casing or meat strand being scanned. The computer is programmed to retain predetermined or position parameters for a range of acceptable casing sizes. The computer is also programmed to signal the power means to cease operation whenever the computer detects that the sensed casing diameter is beyond the predetermined diameter parameters.

The sensor is intended to sense the presence of an unacceptable sausage or meat strand size. The sensor can do this by detecting a casing of unusual diameter, for example, or by detecting the location or position of the upper surface of the casing or meat strand which would indicate a broken casing, for example. In such case, the upper surface of the casing would be at an abnormally lower or higher height.

The method of the invention involves placing an elongated hollow sausage casing on the tube so that meat emulsion exiting the tube will fill the casing; providing operational power to the pump; the twisting assembly; and the linking assembly; extending the tube through the linking assembly so that an exit end thereof terminates adjacent the linking assembly; sensing the outer diameter of the casing downstream from the exit end of the tube; comparing the sensed diameter of the casing with predetermined diameter parameters for a range of acceptable casing diameters; transferring the data from the sensor as to the measured diameter of the casing to a computer; and causing the computer to stop the operation of the machine if the measured diameter is outside the predetermined diameter parameters.

More specifically, in order to remove the difficulty of broken casings and/or the end of casings the invention determines the net distance of the surface of the casing from the sensor. This information is gathered by a sensor, which may be ultrasonic, optical, or mechanical. The information is transmitted to the programmable logic controller which interprets the signal and determines whether to shut off the emulsion pump.

The beginning of each strand of casing is smaller so there is a delay of, for example, 100 m sec to give the casing time to reach its appropriate diameter.

Since the conveying pinchers and twist-inducing butterflies are also entering the field of the scanning device, the readings are processed, for example, averaged every 10 m sec. This window allows the twisted portions of product to go through without telling the PLC that the diameter has fallen below the minimum acceptable for the pumping of emulsion. If averaging data is used, the averaging can be done by the sensor or the PLC. If averaging is not used, then the sensitivity of the sensor may be adjusted to eliminate false readings of bad casings when twists pass the target window.

DESCRIPTION OF THE PREFERRED EMBODIMENT

Figure 1:
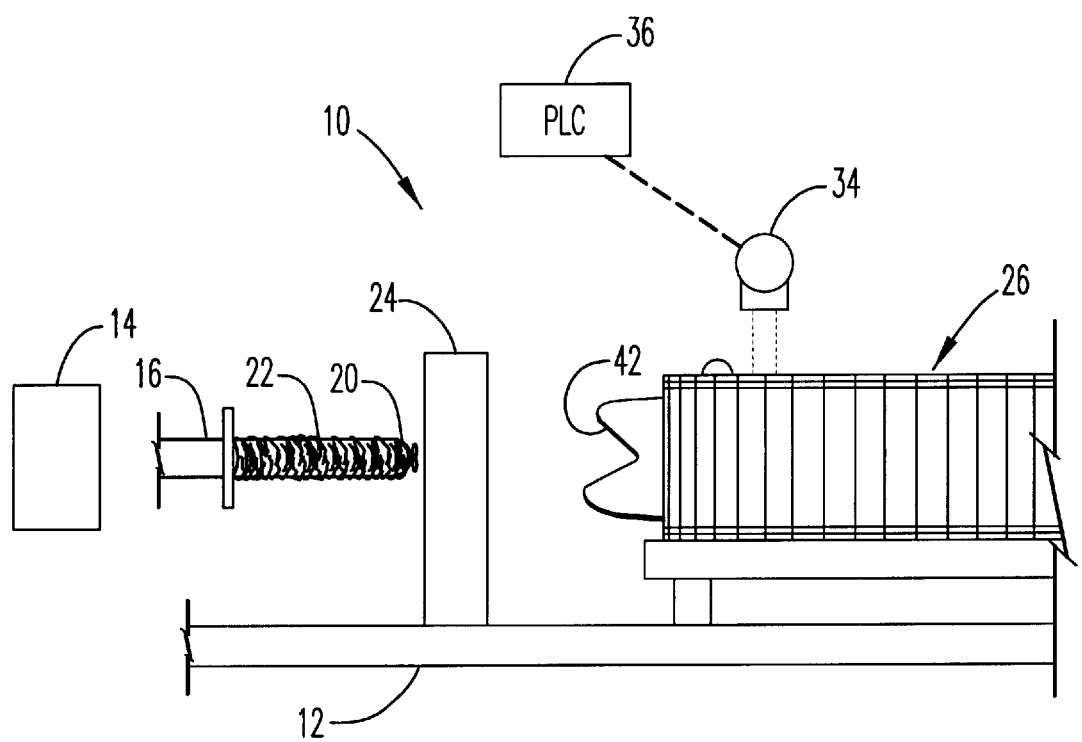
FIG. 1 is a side elevation schematic view of the preliminary positions of a stuffing tube of a sausage encasing machine in relation to the twister assembly, the linking assembly, and a casing diameter sensor.
Figure 2:
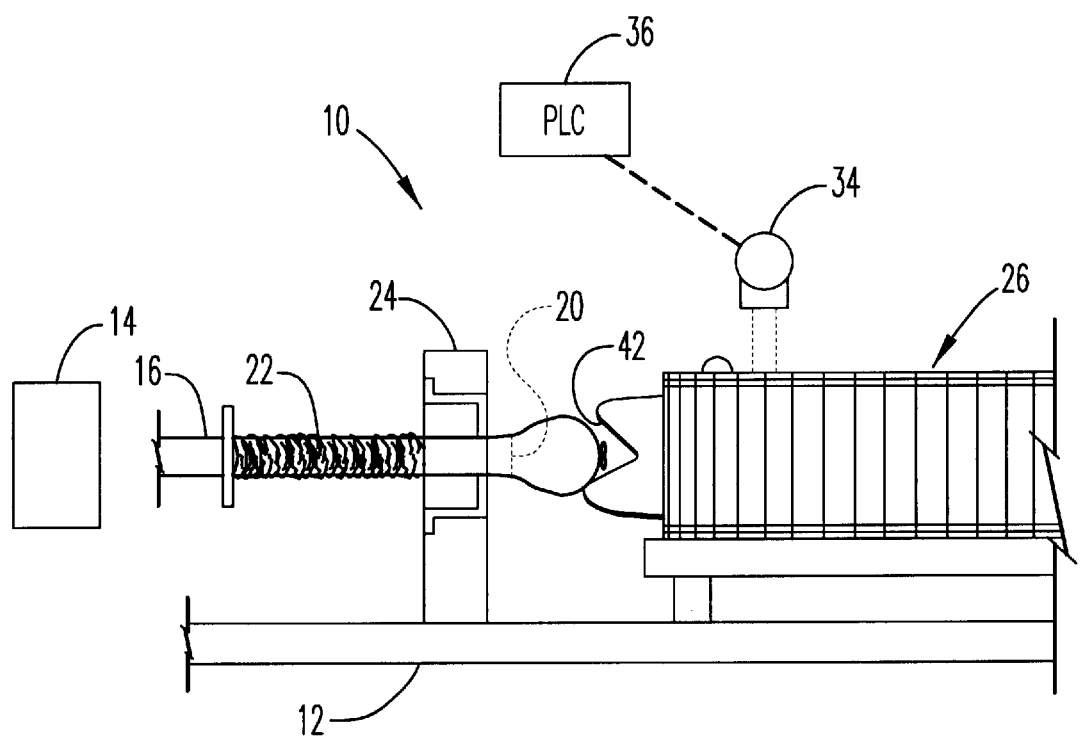
FIG. 2 is a view similar to FIG. 1 but shows the stuffing tube inserted through the twister assembly with a sausage casing on the stuffing tube in its initial stage of receiving meat emulsion from the exit end of the tube.
Figure 3:
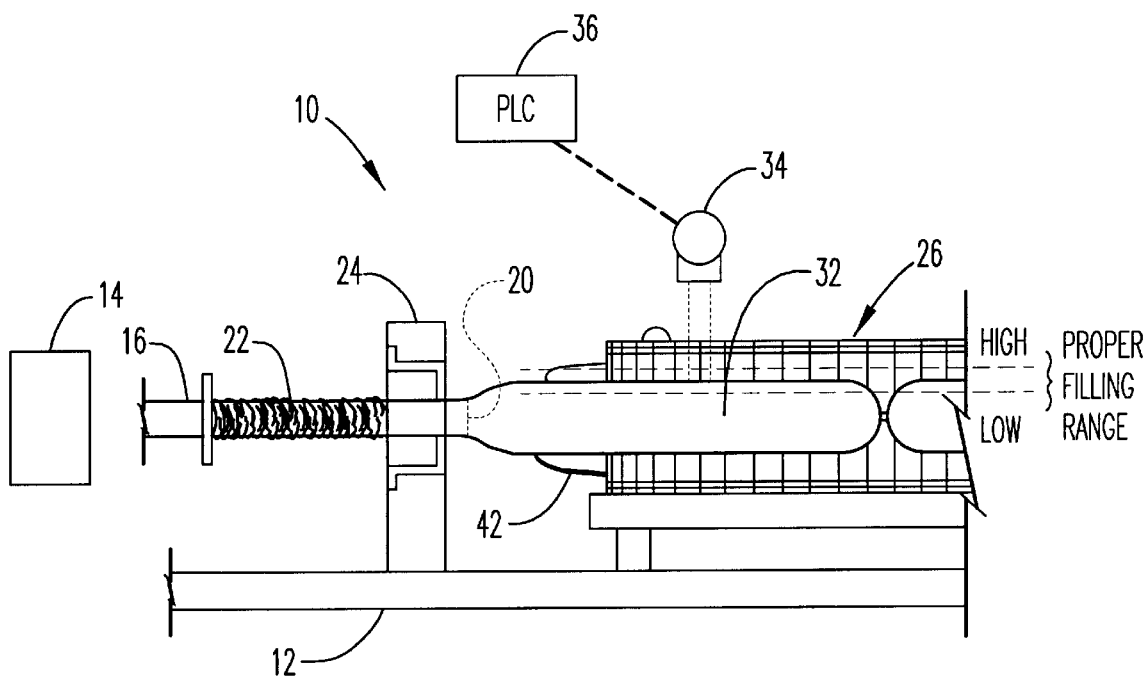
FIG. 3 is a view similar to FIG. 2 but shows the filled casing passing under the casing diameter sensor.
Figure 4:
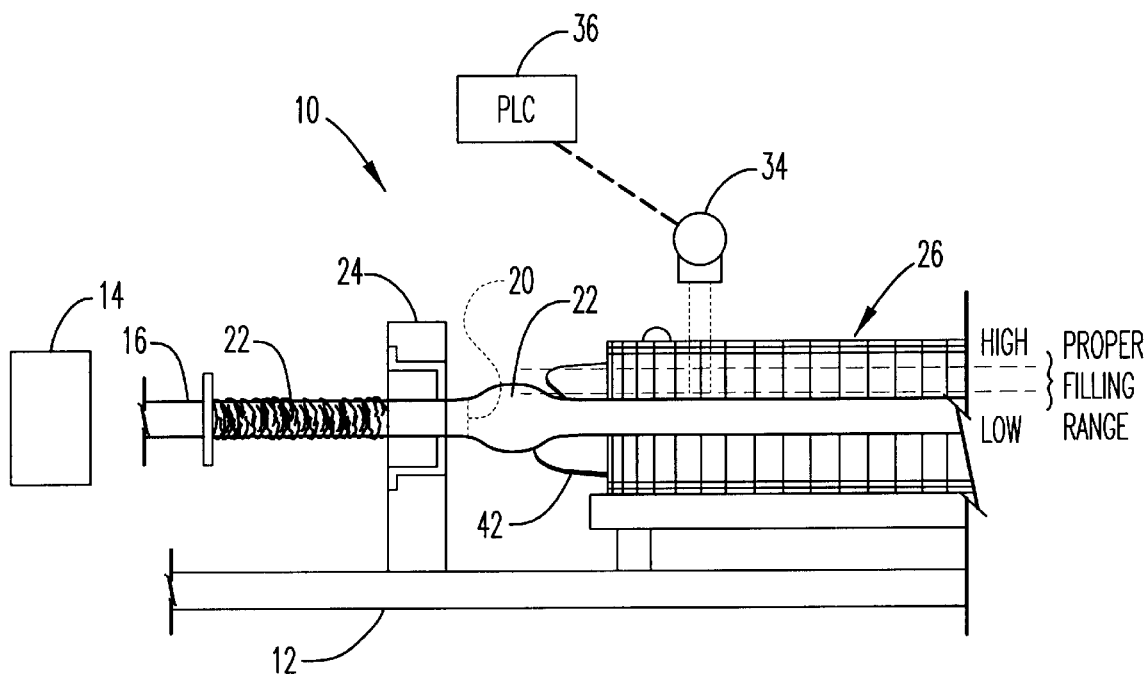
FIG. 4 is a view similar to FIG. 3 but shows a broken casing.
Figure 5:
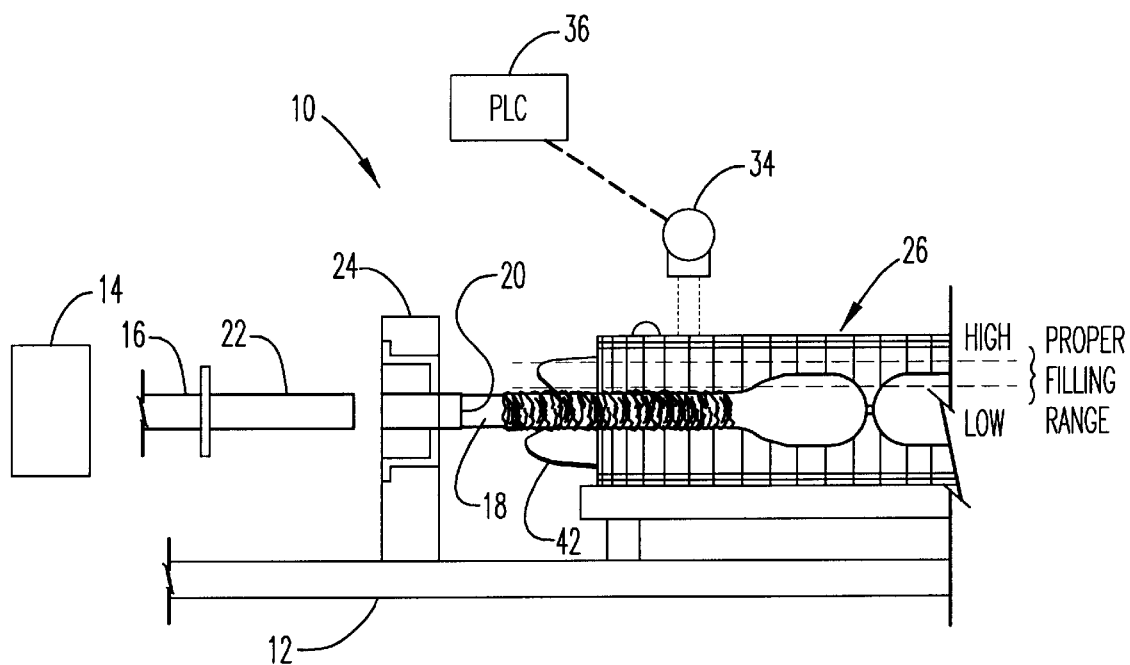
FIG. 5 is a view similar to FIG. 4 but shows conditions when the sausage casing has ended and all of its length has been filled with meat emulsion.

A conventional sausage making machine 10 has a frame 12 with a meat emulsion pump 14 connected to a source of meat emulsion (not shown). A meat stuffing tube 16 is operationally connected to the pump 14 to deliver a stream of meat emulsion 18 from the exit end 20 of the tube 16. The meat emulsion 18 is deposited within sausage casing 22 which is slidably mounted on the outer surface of the tube 16, and fills the casing to a filled condition.

The tube 16 is conventionally longitudinally movable so that its exit end 20 can be moved through a center opening in twister assembly 24. A conventional linking assembly 26 is located slightly downstream from the linker assembly. The twister assembly 24 conventionally rotates casing 22, and twister assembly 24 conventionally converts the filled sausage strand 30 into a plurality of links 32. The foregoing components are conventional and do not of themselves constitute this invention. FIGS. 1–5 show sequentially the steps for filling a casing with meat emulsion.

A sensor 34 is mounted on frame 12 and is operatively connected to PLC 36. The sensor is preferably mounted directly above linking assembly 26 so as to permit the sensor 34 to scan the outer surface of the strand 30 to obtain data on the diameter of the filled casing. The sensor could also be located over the strand 30 between the exit end 20 of the tube 16, and the linking assembly 26.

Figure 6:
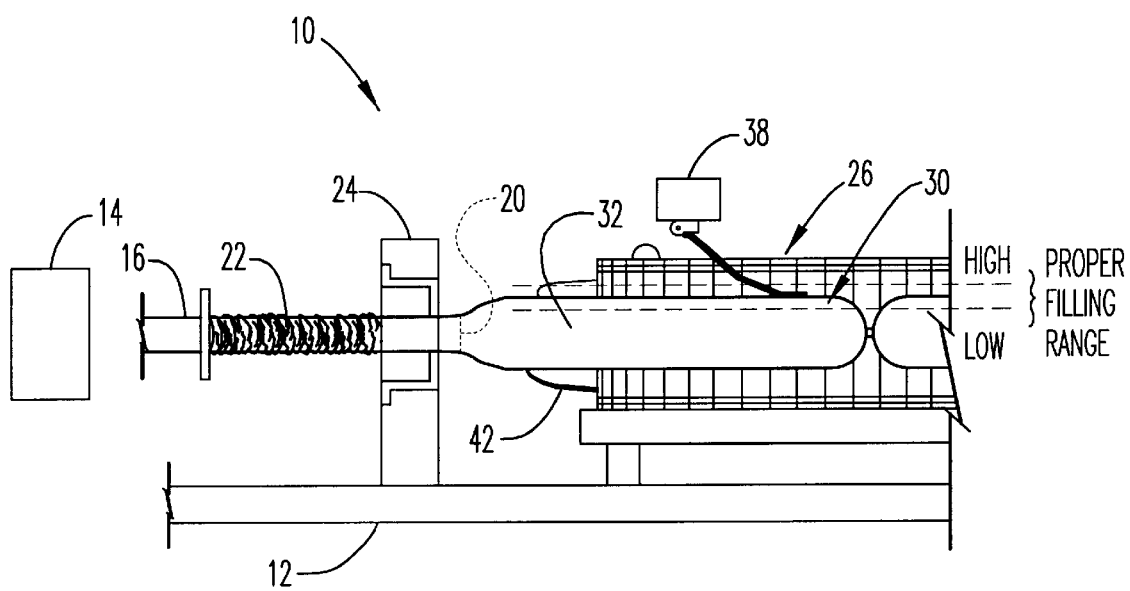
FIG. 6 is an elevational view similar to FIG. 3 but showing the use of a mechanical sensor.
Figure 9:
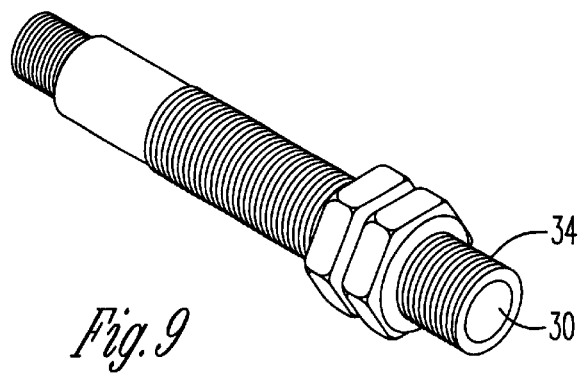
FIG. 9 is a perspective view of an ultrasound sensor useful in this invention.
Figure 10:
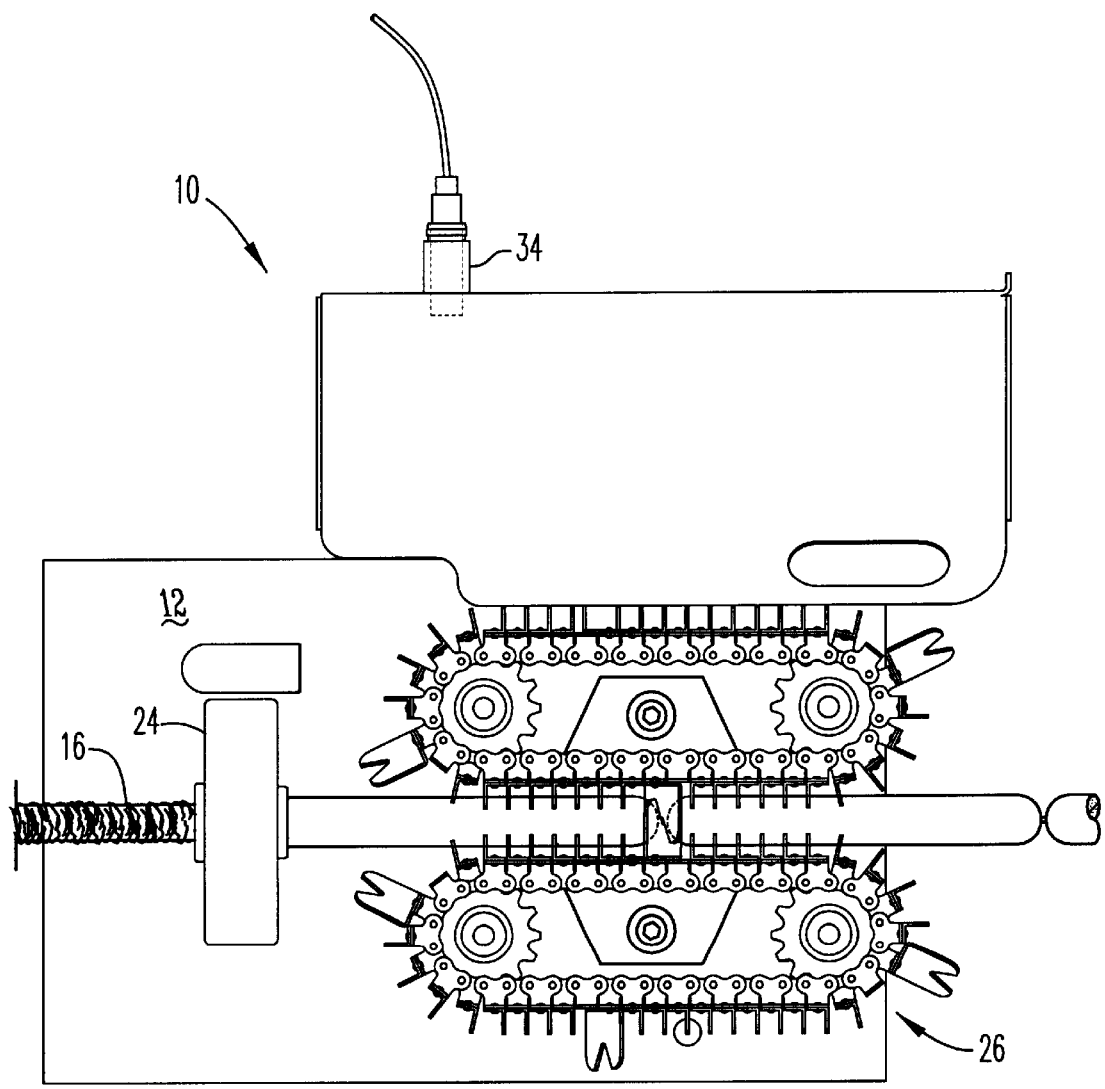
FIG. 10 is a partial plan view of the twisting and linking mechanism.
Figure 11:
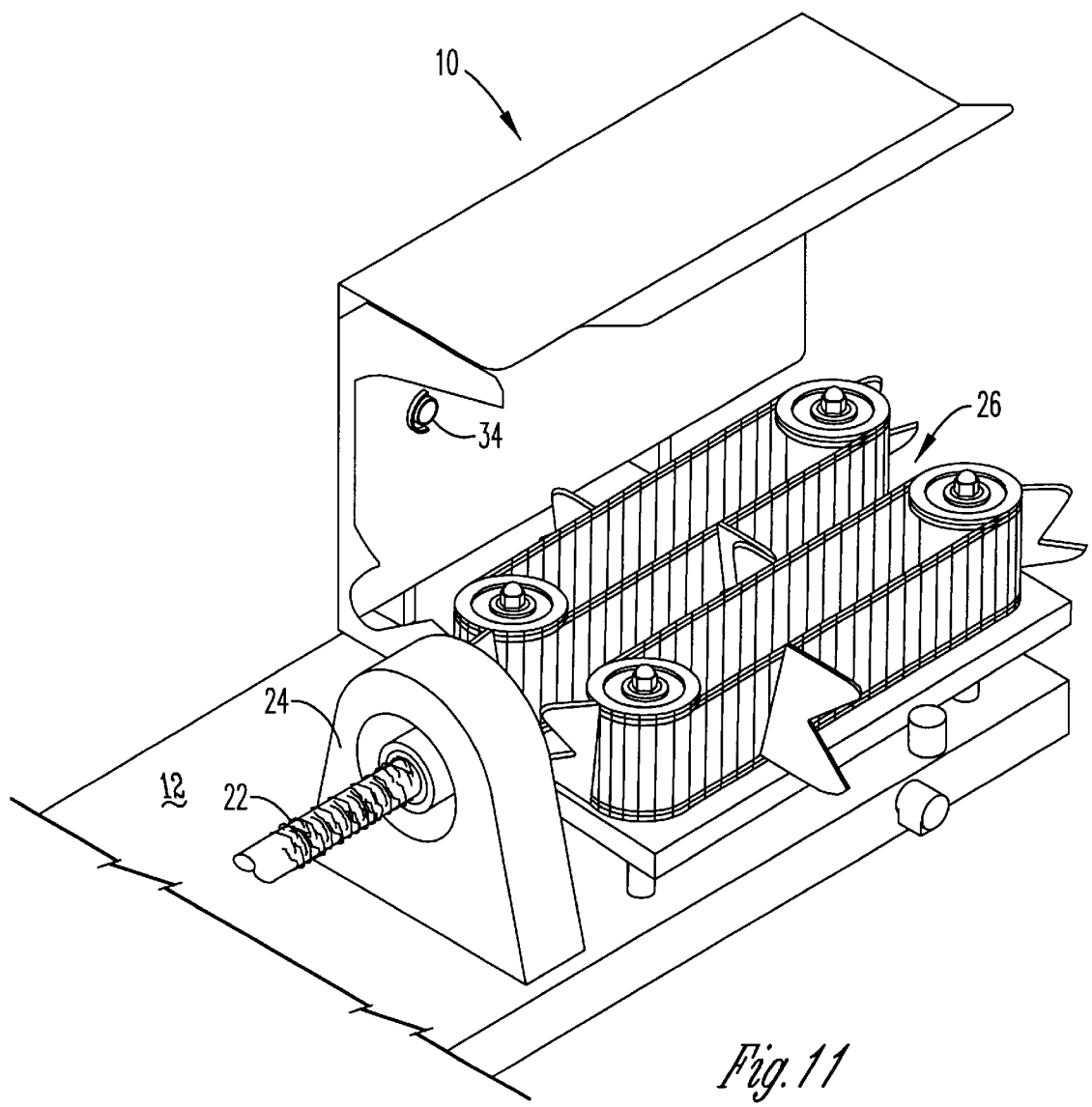
FIG. 11 is a perspective view of the structure shown in FIG. 10.
Figure 12:
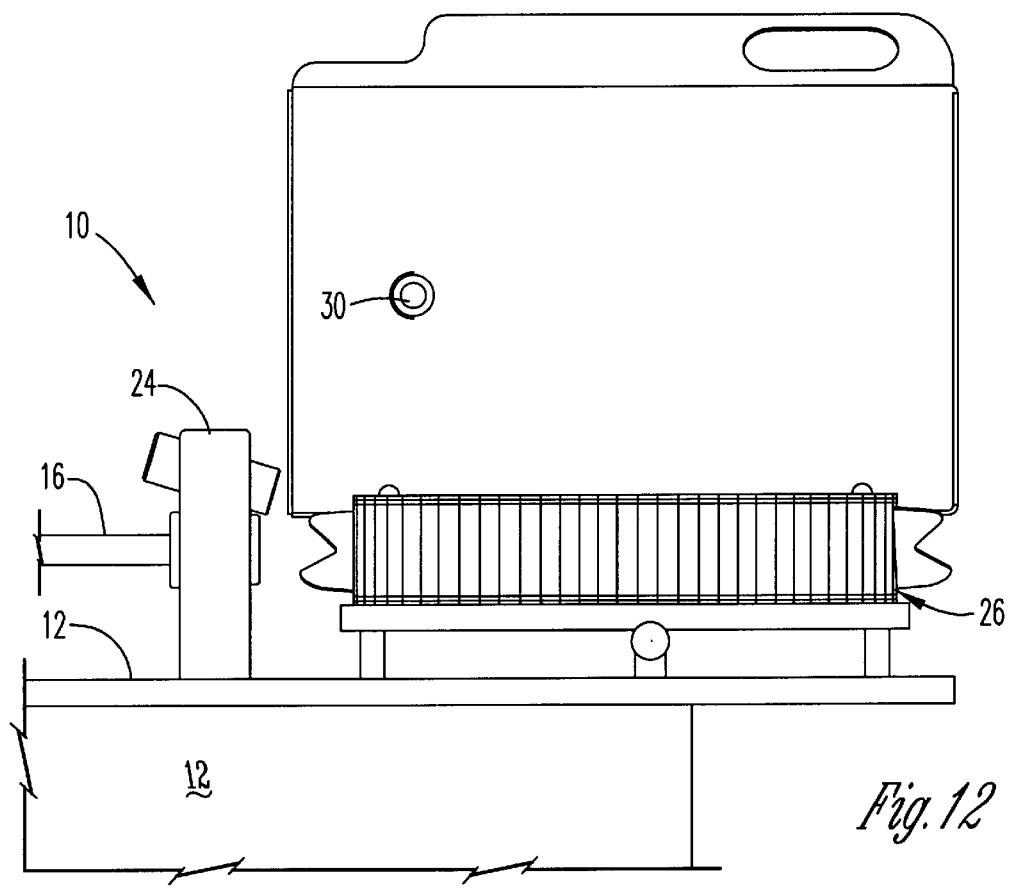
FIG. 12 is an elevational view as seen from the bottom of FIG. 10 with the cover for the linking mechanism in a raised position.
Figure 13:
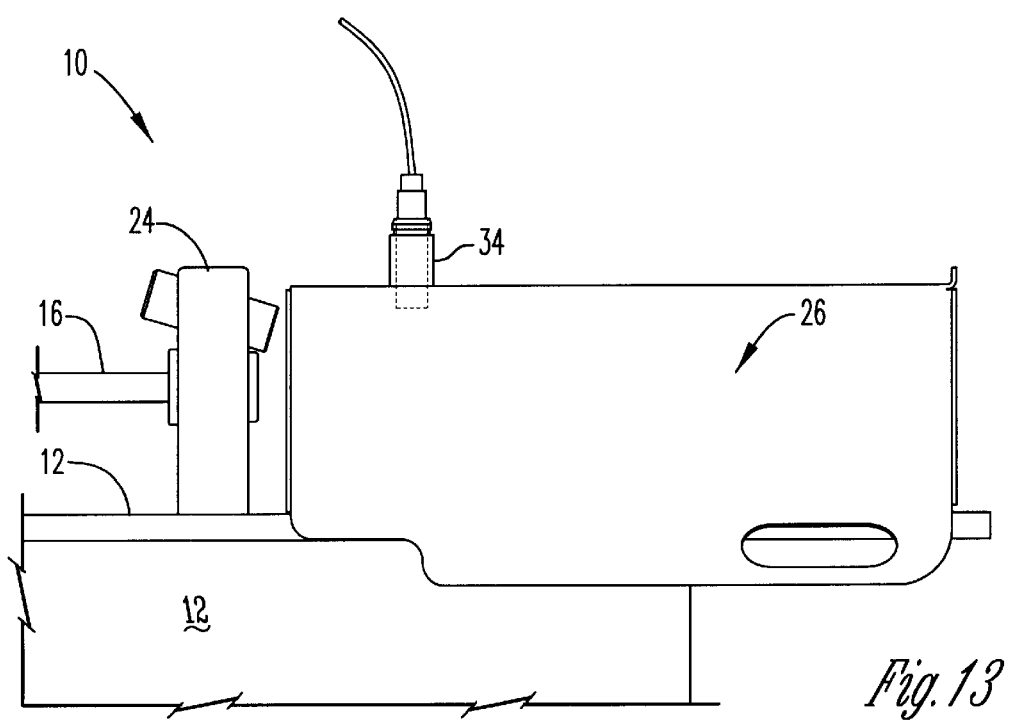
FIG. 13 is a view similar to that of FIG. 12 with the cover in a closed condition.

The sensor 34 can be of ultra sound type; optical (e.g. laser), or mechanicle/electrical such as that shown by micro switch 38 in FIG. 6. The preferred ultra sound proximity sensors 34 are shown in FIG. 9. Ultra sound signals are projected by the sensor 34 to the surface of strand 30 to collect data on the diameter of the strand. The signals reflected to the sensor determine the diameter of the strand, which are then transmitted to the PLC 36. The PLC then compares the received diameter data and compares the data to stored diameter parameters to make sure that the scanned diameter is within a certain acceptable range. The PLC software will cause the motor of motors (not shown) operating the machine 10 to stop if the scanned diameter data is outside the limits of the stored diameter data. Thus, if the diameter of the strand is suddenly decreased because of a break in the casing, the machine 10 would immediately stop.

Figure 7:
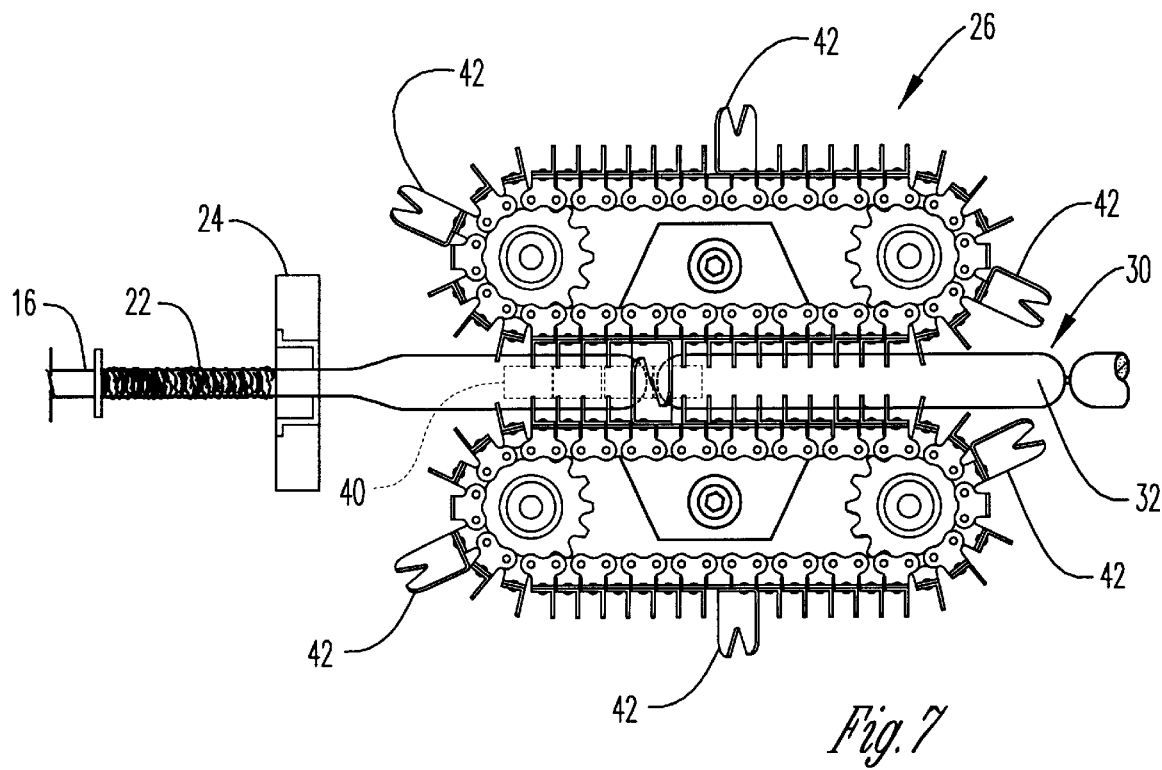
FIG. 7 is a plan view of a linked and filled casing passing through the assemblies of FIGS. 1–5.

Preferably, the sensor 34 will scan the sausage strand for a finite time, e.g. 10 m sec., and average a plurality of scanned diameters within that time frame. (Time segments are shown by the rectangles 40 in FIG. 7). The averaged diameter figure will compensate for scannings that take place over the decreased strand diameters between links 32.

Figure 8:
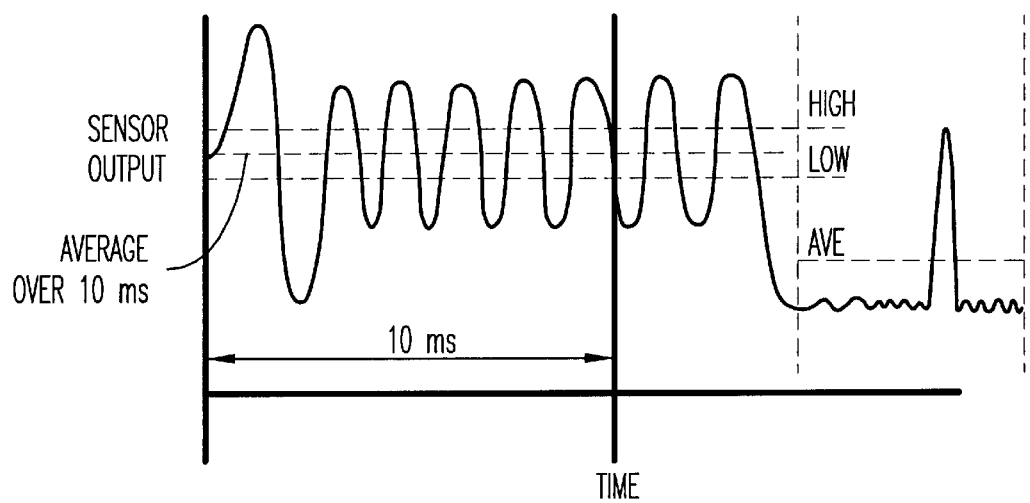
FIG. 8 is a graph showing the activity of the casing diameter sensor dealing with normal and abnormal sausage casings, filled, and broken.

If coarse ground product gets to the end of a casing or breakage of the casing has occurred, the product is so stiff it shows up as one diameter and doesn't trigger a high or low set point. When the product is good there is a difference between high and low reading. However, the operator can look at the graph (FIG. 8) and a table of a good product and can determine the difference between high and low readings. The sensitivity is a range of points that will be used to pull out the high and low reading. Over the range if the high minus the low is less than the differential set point then that is considered to be a bad product.

Also, because the "butterfly" elements 42 on linking assembly 26 may also be sensed, the PLC software should also be arranged to ignore the substantial "diameter" of the butterflies that are scanned, thus preventing the butterflies or other protruding components of the linking assembly from skewing the actual diameter of the scanned sausage strand.

This invention, particularly in the stuffing of natural casings which vary in length, is very useful in shutting down the encasing machine whenever the scanned diameter of the strand moves beyond predetermined parameters, regardless of the cause. It is therefore seen that this invention will achieve at least all of its stated objectives.

We claim:

1. A sausage encasing machine including a frame, a meat emulsion pump, an elongated stuffing tube operatively connected to the pump for receiving meat emulsion therefrom and being adapted to slidably receive an elongated hollow sausage casing on an outer surface thereof, a twisting assembly adapted to receive and rotate a casing on the tube when the tube is moved into operative engagement therewith, a casing linking assembly on the frame downstream of the twister assembly to link the casing filled with meat emulsion; and power means on the frame for operating the pump, the twisting assembly, and the linker assembly, the invention comprising, a casing diameter sensor located on the frame located downstream of an exit end of the tube to sense the diameter of the casing downstream of the exit end of the tube, the sensor being operatively connected to the computer to transmit data to the computer as to the casing being sensed, the computer being programmed to predetermined diameter parameters for a range of acceptable casing diameters, said computer being programmed to signal the power means to cease operation whenever the computer detects that the sensed casing diameter is beyond the predetermined diameter parameter, and wherein the sensor scans for a predetermined time a length of the casing to gather a plurality of diameter data of the casing as the casing moves downstream from the exit end of the tube, means for determining the average diameter of the tube sensed during the predetermined time, whereupon the average diameter is used by the computer for comparison with the predetermined diameter parameters.

2. The machine of claim 1 wherein the sensor is located over the linking assembly.

3. The machine of claim 1 wherein the sensor is an ultrasound proximity sensor.

4. The machine of claim 1 wherein the sensor is an optical signal proximity sensor.

5. The machine of claim 1 wherein the sensor is an mechanical-electrical proximity sensor.

6. A method of controlling a sausage encasing machine including a frame, a meat emulsion pump, and an elongated stuffing tube operatively connected to the pump for receiving meat emulsion therefrom and being adapted to slidably receive an elongated hollow sausage casing on an outer surface thereof, a twisting assembly adapted to receive and rotate a casing on the tube when the tube is moved into operative engagement therewith, a casing linking assembly on the frame downstream of the twister assembly to link the casing filled with meat emulsion, and power means on the frame for operating the pump, the twisting assembly and the linking assembly, the invention comprising, placing an elongated hollow sausage casing on the tube so that meat emulsion exiting the tube will fill the casing, providing operational power to the pump, the twisting assembly, and the linking assembly, extending the tube through the linking assembly so that an exit end thereof terminates adjacent the linking assembly, sensing the outer diameter of the casing downstream from the exit end of the tube, comparing the sensed diameter of the casing with predetermined diameter parameters for a range of acceptable casing diameters, transferring the data from the sensor as to the measured diameter of the casing to a computer, causing the computer to stop the operation of the machine if the measured diameter is outside the predetermined diameter parameters, and wherein the sensor is permitted to scan for a predetermined time a length of the casing to gather a plurality of diameter data of the casing as the casing moves downstream from the exit end of the tube, averaging the diameter of the tube scanned during the predetermined time, and using the average diameter for comparison with the predetermined diameter parameters.

7. The method of claim 6 wherein the sensor scans the casing as the casing moves through the linking assembly.

8. The method of claim 6 wherein the sensor is an ultrasound proximity sensor.

9. The method of claim 6 wherein the sensor is an optical sensor.

10. The method of claim 6 wherein the sensor is a mechanical electrical sensor.

11. A suasage encasing machine including a frame, a meat emulsion pump, an elongated stuffing tube operatively connected to the pump for receiving meat emulsion therefrom and being adapted to slidably receive an elongated hollow sausage casing on an outer surface thereof, a casing linking assembly on the frame downstream to link the casing filled with meat emulsion, and power means on the frame for operating the pump, and the linker assembly, the invention comprising, a computer on the frame, a casing diameter sensor located on the frame located downstream of an exit end of the tube to sense the diameter of the casing downstream of the exit end of the tube, the sensor being operatively connected to the computer to transmit data to the computer as to the casing being sensed, the computer being programmed to predetermined diameter parameters for a range of acceptable casing diameters, and wherein the sensor scans for a predetermined time a length of the casing to gather a plurality of diameter data of the casing as the casing moves downstream from the exit end of the tube, the computer determining the average diameter of the tube sensed during the predetermined time, whereupon the average diameter is used by the computer for comparison with the predetermined diameter parameters.

12. The machine of claim 11 wherein the sensor is located over the linking assembly.

13. The machine of claim 11 wherein the sensor is an ultrasound proximity sensor.

14. The machine of claim 11 wherein the sensor is an optical signal proximity sensor.

15. The machine of claim 11 wherein the sensor is an mechanical-electrical proximity sensor.

16. The machine of claim 11 wherein the sensor has means to ignore signals created by the passage of machine components that may be scanned by the sensor.

17. A method of controlling a sausage encasing machine including a frame, a meat emulsion pump, and an elongated stuffing tube operatively connected to the pump for receiving meat emulsion therefrom and being adapted to slidably receive an elongated hollow sausage casing on an outer surface thereof, a casing linking assembly on the frame downstream of the twister assembly to line the casing filled with meat emulsion, and power means on the frame for operating the pump, the twisting assembly and the linking assembly, the invention comprising, placing an elongated hollow sausage casing on the tube so that meat emulsion exiting the tube will fill the casing, providing operational power to the pump, the twisting assembly, and the linking assembly, sensing the outer diameter of the casing downstream from the exit end of the tube, comparing the sensed diameter of the casing with predetermined diameter parameters for a range of acceptable casing diameters, causing of the computer to stop the operation of the machine if the measured diameter is outside the predetermined diameter parameters; and wherein a sensor provides the sensing, and ignores signals created by the passage of machine components that may be scanned by the sensor.

* * * * *